United States Patent
Kurtzberg et al.

(10) Patent No.: US 6,240,330 B1
(45) Date of Patent: May 29, 2001

(54) METHOD FOR FEEDFORWARD CORRECTIONS FOR OFF-SPECIFICATION CONDITIONS

(75) Inventors: Jerome M. Kurtzberg; Menachem Levanoni, both of Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 08/864,303

(22) Filed: May 28, 1997

(51) Int. Cl.$^7$ ............................. G06F 19/00; G05B 13/02
(52) U.S. Cl. ............................. 700/121; 700/44; 700/105
(58) Field of Search ............................. 364/468.01, 149, 364/468.24, 474.17, 164; 700/95, 117, 105, 44, 108, 110, 116, 121; 702/84

(56) References Cited

U.S. PATENT DOCUMENTS

| | | | |
|---|---|---|---|
| 5,229,948 | * 7/1993 | Wei et al. | 364/468 |
| 5,379,237 | * 1/1995 | Morgan et al. | 364/578 |
| 5,457,625 | * 10/1995 | Lim et al. | 364/149 |
| 5,608,660 | * 3/1997 | Morgan et al. | 364/562 |

FOREIGN PATENT DOCUMENTS

| | | |
|---|---|---|
| 2-71962 | 3/1990 | (JP) . |
| 4-44208 | 2/1992 | (JP) . |

\* cited by examiner

*Primary Examiner*—Albert De Cady
*Assistant Examiner*—Shelly A Chase
(74) *Attorney, Agent, or Firm*—McGinn & Gibb, P.C.; Stephen C. Kaufman, Esq.

(57) ABSTRACT

In current manufacturing practices, if a process results in a partial product which is outside its specification, it is either sent back to be reworked, or is scrapped. This results in unacceptable waste. The present invention comprises a method for minimizing this wasted work and materials, by corrective actions by subsequent processes. This approach is general, and is capable of correcting the effects of out-of-specs manufacturing process conditions, including the salvaging of partial product, thereby obviating the need for rework or scrap.

9 Claims, 1 Drawing Sheet

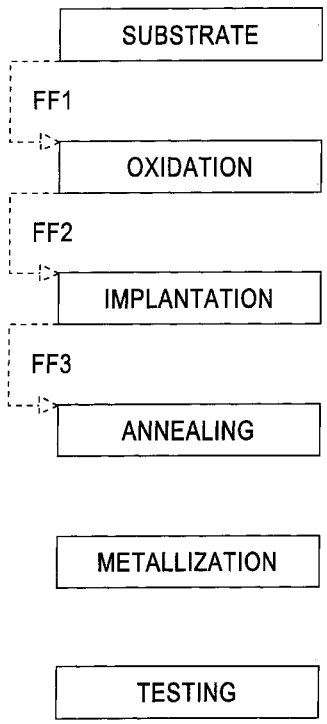

MOS CAPACITOR FABRICATION

| | VAR | PARAMETER |
|---|---|---|
| SUBSTRATE | X1 | Charge Distrib. |
| FF1 | | |
| OXIDATION | X2<br>X3<br>Y2 | Time<br>Temperature<br>Thickness |
| FF2 | | |
| IMPLANTATION | X4<br>X5<br>Y3 | Dose<br>Energy<br>Sheet Resist. |
| FF3 | | |
| ANNEALING | X6<br>X7<br>Y4 | Time<br>Temperature<br>Charge Distrib. |
| METALLIZATION | | |
| TESTING | Y0 | Threshold Voltage |

Fig. 1

METHOD FOR FEEDFORWARD CORRECTIONS FOR OFF-SPECIFICATION CONDITIONS

FIELD OF THE INVENTION

This invention relates to a novel method for optimizing a manufacturing production of a workpiece.

INTRODUCTION TO THE INVENTION

An indicia of current manufacturing practices is that, if a process results in a partial product which is outside its ideal values for a parameter list corresponding to a completed workpiece, the partial product is either sent back to be reworked, or is scrapped. This practice, however, may result in unacceptable waste.

SUMMARY OF THE INVENTION

Our work centers on a critique of the capabilities and viability of the foregoing representative current manufacturing practices, to an end of disclosing novel methodology which can minimize the waste and inefficiency of the type immanent in the current practices.

A centerpiece of our novel methodology comprises corrective feedforward actions by subsequent (with respect to identification of in-process workpiece status) manufacturing processes.

In overview, the novel method is suitable for optimizing manufacturing production of a workpiece, and specifying ideal values for a parameter list corresponding to a completed workpiece;

subjecting the workpiece to an initial manufacturing process to an end of producing the completed workpiece in satisfaction of the ideal values;

monitoring the manufacturing process for ascertaining the status of the in-process workpiece with respect to the ideal values; and providing feedforward corrective action to the manufacturing process conditioned by the status of the in-process workpiece.

An important advantage of the novel method as defined is that the approach is general and is capable of correcting the effects of out-of-specs manufacturing process conditions, including the salvaging of partial product, thereby obviating a need for rework or scrap.

BRIEF DESCRIPTION OF THE DRAWING

The invention is illustrated in the accompanying drawing, in which:

FIG. 1 provides a MOS Capacitor Fabrication flowchart in illustration of an Example of the present invention.

DETAILED DESCRIPTION OF THE INVENTION

The detailed description of the invention proceeds by first re-conceptualizing the summarized invention by way of the following three steps: Step 1—Models; Step 2—Correlations; Step 3—Operation; and, by presenting an Example of the invention.

Step 1: Models
 (i) Model each manufacturing process in terms of its inputs and outputs.
 (ii) Develop the processing flow of all processes leading to the complete product.
 (iii) Establish the relationship between the manufacturing processes and the associated partial products as well as the functional characteristics of the final product. In particular, establish the model relating the functional characteristics of the final product to the outputs of every manufacturing process leading to it.

At the conclusion of this step, models of all manufacturing processes are available, as well as models for partial and final products, in terms of input/output relationships.

Step 2: Correlations
 (i) Derive the inter-process correlations between all pairs of manufacturing processes;
 (ii) Create a correlation matrix between all pairs of manufacturing processes, where 1 indicates existence of correlation and 0 indicates lack of correlation (an enhancement can have the degree of correlation as the matrix elements).

At the conclusion of this Step 2, information is available as to interactions between all pairs of manufacturing processes, including the final product. These can be used to correct out-of-specs conditions.

Step 3: Operation
 (i) Start the manufacturing production. For any manufacturing process, if the result is within specs, proceed normally. Otherwise, notify the subsequent mfg. process of out-of spec condition.
 (ii) If the subsequent manufacturing process is correlated (from step 2) to the previous step, use the models in step 1 to modify its set points so as to bring the item back into specs (or as much as possible). Otherwise, proceed normally.
 (iii) Proceed in this fashion with production, correcting (if required) any out-of-spec conditions in one step at the first subsequent manufacturing process capable of bringing the item back into specs.

Note that the model used to bring the item back into specs is the final product model which at each step, assumes that all subsequent manufacturing processes (not yet implemented) are at their nominal settings.

Thus, after every manufacturing process, and using the models described in step 1 and the correlations described in step 2, it is possible to establish a corrective action which can bring the final product back into specs. The item is reworked only if it isnot possible to correct out-of-specs conditions.

In a separate implementation, the models and correlations may be used as above, but the corrective action for out-of-specs condition is distributed among all correlated manufacturing processes. This has the advantage of minimizing the sizes of corrective steps, which now are not performed at a single process, but instead are distributed among several correlated processes.

EXAMPLE

The method of the present invention is now manifest by way of an Example comprising MOS capacitor fabrication.

MOS capacitor fabrication is a multi-step process which can produce a device used in semiconductor fabrication lines.

The capacitor was designed with a target threshold voltage of 1 volt. Note that this is a functional specification of a completed workpiece.

The complete MOS capacitor fabrication process consisted of six steps:

(1) substrate characterization,
(2) thermal oxidation,
(3) ion implantation,
(4) annealing,
(5) metallization, and
(6) device testing.

Each process step consisted of independent variables (inputs), dependent variables or responses (outputs) and models which could quantify the relationship between the inputs and the outputs. For this application, the substrate carried a single variable—charge concentration. The specification for this variable was a uniform boron concentration of 5E16+−1E16 atoms/cc. For the oxidation step, the variables were time and temperature of oxidation. The response was the oxide film thickness. The specifications for this process step were: oxidation time of 45+−5 minutes, oxidation temperature of 800+−10 degrees C., and oxide thickness of 24+−2 nanometers. For the implantation step, the variables were ion dose and implant energy. The response was the sheet-resistance of the implanted layer parameters.

The specifications for this process step were: implantation energy of 30+−5 Kev, implantation dosage of 1E12+−5E11 atoms/cm2 and sheet-resistance of 5240+−500 ohms/square. For the annealing step the variables were annealing time and temperature, and the responses are dopant distribution parameters, which were modelled via diffusion models. The specifications for this process step were: annealing time of 60+−5 minutes and annealing temperature of 1000+−10 degree C. Dopant distribution was not specified for this step. For simplicity, the metallization step was assumed to be ideal. Thus, no parameters are listed or needed. The device test step measured the threshold voltage of the completed workpiece, with a design specification of 1 volt.

Models exist for each process step, and quantitatively describe the relationship between variable (inputs) and response (outputs). A global model relates the functional variables of the completed workpiece to the process variables used in its fabrication.

Feedforward Operation

FIG. 1, numeral 10, illustrates feedforward adjustments of an MOS capacitor in which several process steps are off their ideal targets.

1. To achieve a threshold voltage of 1 volt with an initial substrate concentration of 4.8E16 atoms/cc which is lower than the target of 5.0E16, but within the +−0.5E16 tolerance, the models derive an oxidation time of 44.837 minutes which is within specifications of 45+−2.5 minutes. These modified targets for the oxidation step bring the capacitor back on the target of 1 volt without changes in the following process steps.

2. Given that the imperfect oxidation step results in oxidation time of 46 minutes and oxidation temperature of 807 degrees, which is off the temperature specification of 800+−5, the implantation energy must be changed to 52.853 keV to bring the capacitor back on target, assuming that the remaining variables are on target.

3. Given that the implantation step results in an implant energy of 30 keV and in implant dose of 5.6E11 atoms/cm2, which is on the energy target but off the dose specification of 1E12+−2.55E11, an annealing time of 59.772 minutes is required to bring the capacitor back on target with a nominal annealing temperature of 1000 degrees C.

Detailed results of an implementation of the feedforward technique, with more feedforward steps, are shown below. The three steps discussed above correspond to steps 1, 3 and 5 in the material.

Note that by following the previous feedforward corrective actions, we have eliminated unnecessary scrapping or rework of intermediate workpieces, which otherwise would have occurred due to the off specification oxidation temperature and implant dose.

Feedforward Illustartion in MOS Capacitor Fabrication

Given the product response map, this program suggests feedforward corrective action for each off-target variable. The program selects the optimum adjustment, in the next variable, to bring the product back on target, with minimum adjustments of subsequent variables.

Y0—Capacitor Threshold Voltage (product target; in volts)
X1—Substrate doping level (in atoms/cc)
X2—Oxidation Time (in minutes)
X3—Oxidation Temperature (in degrees C.)
X4—Ion Implantation Energy (in kilovolts)
X5—Ion Implantation Dose (in atoms/cm2)
X6—Annealing Time (in minutes)
X7—Annealing Temperature (in degrees C.)
ENTER TARGET THRESHOLD VOLTAGE (IN VOLTS): 1

STEP 1. ENTER MEASURED VARIABLE 1 (SPECS. = 5E16 ± .5E16): 4.8E16

| Y0 | X1 | X2 | X3 | X4 | X5 | X6 | X7 |
|---|---|---|---|---|---|---|---|
| 1.000 | 4.80E16 | 44.837 | 800.00 | 30.000 | 1.00E12 | 60.000 | 10000.000 |

SUGGESTED SETTING FOR VARIABLE 2: 44.837

STEP 2. ENTER MEASURED VARIABLE 2 (SPECS. = 45 ± 2.5): 46

| Y0 | X1 | X2 | X3 | X4 | X5 | X6 | X7 |
|---|---|---|---|---|---|---|---|
| 1.000 | 4.80E16 | 46.000 | 798.705 | 30.000 | 1.00E12 | 60.000 | 1000.000 |

SUGGESTED SETTING FOR VARIABLE 3: 798.705

STEP 3. ENTER MEASURED VARIABLE 3 (SPECS. = 800 ± 5): 807

| Y0 | X1 | X2 | X3 | X4 | X5 | X6 | X7 |
|---|---|---|---|---|---|---|---|
| 1.000 | 4.80E16 | 46.000 | 807.000 | 52.853 | 1.00E12 | 60.000 | 1000.000 |

SUGGESTED SETTING FOR VARIABLE 4: 52.853

-continued

STEP 4. ENTER MEASURED VARIABLE 4 (SPECS. = 30 ± 2.5): 30

| YO | X1 | X2 | X3 | X4 | X5 | X6 | X7 |
|---|---|---|---|---|---|---|---|
| 1.000 | 4.80E16 | 46.000 | 807.000 | 30.000 | 5.60E11 | 60.000 | 1000.000 |

SUGGESTED SETTING FOR VARIABLE 5: 5.60E11

STEP 5. ENTER MEASURED VARIABLE 5 (SPECS. = 1E12 ± 2.5E11): 5.6E11

| YO | X1 | X2 | X3 | X4 | X5 | X6 | X7 |
|---|---|---|---|---|---|---|---|
| 1.000 | 4.80E16 | 46.000 | 807.000 | 30.000 | 5.60E11 | 59.772 | 1000.000 |

SUGGESTED SETTING FOR VARIABLE 6: 59.772

STEP 6. ENTER MEASURED VARIABLE 6 (SPECS. = 60 ± 2.5): 59.772

| YO | X1 | X2 | X3 | X4 | X5 | X6 | X7 |
|---|---|---|---|---|---|---|---|
| 1.000 | 4.80E16 | 46.000 | 807.000 | 30.000 | 5.60E11 | 59.772 | 1000.000 |

SUGGESTED SETTING FOR VARIABLE 7: 1000

STEP 7. ENTER MEASURED VARIABLE 7 (SPECS. = 1E3 ± 5): 1000

| YO | X1 | X2 | X3 | X4 | X5 | X6 | X7 |
|---|---|---|---|---|---|---|---|
| 1.000 | 4.80E16 | 46.000 | 807.000 | 30.000 | 5.60E11 | 59.772 | 1000.000 |

FINAL RESULT.

What is claimed is:

1. A method for optimizing manufacturing production of a workpiece, the method comprising:

(i) specifying ideal values for a parameter list corresponding to a completed workpiece;

(ii) subjecting the workpiece to a plurality of manufacturing processes so as to produce the completed workpiece in satisfaction of said ideal values;

(iii) monitoring the workpiece after a first manufacturing process for ascertaining the status of the in-process workpiece with respect to said ideal values;

(iv) providing feedforward corrective actions to said manufacturing processes conditioned by said status of the in-process workpiece after the first manufacturing process to alter target values of said parameter list;

(v) monitoring the workpiece after a second manufacturing process for ascertaining the status of the in-process workpiece with respect to said ideal values; and (vi) providing feedforward corrective actions to said manufacturing processes conditioned by said status of the in-process workpiece after the second manufacturing process to alter target values of said parameter list until the in-process workpiece is brought back within specifications, wherein out-of-specifications conditions determined in a previous manufacturing process are corrected beginning in a next subsequent manufacturing process capable of bringing the in-process workpiece back within specifications.

2. A method according to claim 1, wherein the feedforward corrective action comprises subjecting the workpiece to a modified manufacturing process.

3. A method according to claim 2, wherein the feedforward corrective action comprises identifying a particular manufacturing process step to an end of modifying its internal parameters target values.

4. A method according to claim 1, wherein the feedforward corrective action comprises distributing compensatory action through a plurality of discrete manufacturing process steps.

5. The method according to claim 1, wherein prior to said specifying ideal values, said method further includes establishing models relating functional characteristics of a final product to outputs of every manufacturing process leading to said final product, such that models of all manufacturing processes are generated, and models for partial and final products are generated based on input/output relationships.

6. The method according to claim 1, wherein prior to said specifying ideal values, said method further comprises deriving inter-process correlations between all pairs of manufacturing processes, and creating a correlation matrix between all pairs of manufacturing processes, such that information is generated as to interactions between all pairs of manufacturing processes including a final product.

7. The method according to claim 1, wherein said providing feedforward corrective actions includes notifying a subsequent manufacturing process of an out-of-specification condition, and wherein if a subsequent manufacturing process is correlated to a previous step, said models are used to modify its ideal value to produce said target values to bring the product back into specifications.

8. The method according to claim 1, wherein a model used to bring the workpiece back into specifications is a final product model which at each step, assumes that all subsequent manufacturing processes are at their nominal settings.

9. The method according to claim 1, wherein said providing feedforward corrective actions includes selecting the optimum adjustment, in the next variable to bring the workpiece back into specifications, with minimum adjustments of subsequent variables.

* * * * *